(12) United States Patent
Hundley, Jr.

(10) Patent No.: US 6,740,133 B2
(45) Date of Patent: May 25, 2004

(54) CHEMICAL CHANGE AGENT FOR COAL AND METHOD OF USING SAME

(75) Inventor: Joseph W. Hundley, Jr., Martinsville, VA (US)

(73) Assignee: Clean Fuel Technologies, L.L.C., Hardy, VA (US)

( * ) Notice: Subject to any disclaimer, the term of this patent is extended or adjusted under 35 U.S.C. 154(b) by 0 days.

(21) Appl. No.: 09/757,765

(22) Filed: Jan. 10, 2001

(65) Prior Publication Data

US 2003/0037483 A1 Feb. 27, 2003

(51) Int. Cl.$^7$ .................................................. C10L 9/10
(52) U.S. Cl. ............................ 44/301; 44/280; 44/281; 44/302
(58) Field of Search .......................................... 44/302

(56) References Cited

U.S. PATENT DOCUMENTS

| | | | |
|---|---|---|---|
| 3,898,076 A | * | 8/1975 | Ranke ............................. 75/3 |
| 3,935,021 A | * | 1/1976 | Greve et al. .................... 524/4 |
| 4,097,437 A | | 6/1978 | Dhake |
| 5,330,795 A | | 7/1994 | Batdorf |
| 5,437,722 A | * | 8/1995 | Borenstein .................. 106/778 |
| 5,578,239 A | * | 11/1996 | Bennett ...................... 252/88.1 |
| 5,631,042 A | | 5/1997 | Becker |

FOREIGN PATENT DOCUMENTS

JP 2000080356 * 3/2000

* cited by examiner

*Primary Examiner*—Cephia D. Toomer
(74) *Attorney, Agent, or Firm*—James W. Hiney

(57) ABSTRACT

An acqueous synfuel composition to be used as an additive for coal and like combustible materials to cause chemical bonding with the coal or materials to transform it into a substance legally defined by United States Air Quality Regulations as a synfuel. The composition contains polyvinyl alcohol, a hydrocarbon wax, and water which interact with the coal or material.

17 Claims, 4 Drawing Sheets

CHEMICAL CHANGE AGENT FOR COAL AND METHOD OF USING SAME

BACKGROUND OF THE INVENTION

The present invention relates to a liquid synfuel additive composition for application to materials such as coal for facilitating more complete and efficient combustion thereof.

PRIOR ART

There is no existing prior art so far as the inventors hereof are aware. There have been fatty acids used in making wax emulsions for the purpose of sealing them against liquid water.

Although polyvinyl alcohol is know both as a film-forming agent and an emulsifier, it does not meet ASTM standard C 309-95 when tested as a liquid membrane-forming compound for curing concrete. The reason for this is that although polyvinyl alcohol typically exhibits a low permeability to gases, it does not exhibit a low permeability to either ammonia or water vapor. As a result, polyvinyl alcohol is insufficient to prevent significant loss of water from concrete during curing.

Paraffinic compounds are known to be water repellant and thus paraffin is typically used as a compound of wood preservative agents. For Example, U.S. Pat. No. 4,389,446 discloses a composition useful as a wood preservative agent which includes an organic solvent, solid paraffin as a water repellant agent and a biocide.

There is a great need for additives to combustibles these days which tend to act as chemical change agents to facilitate more complete combustion. Accordingly, there is an ongoing need for such chemical change agents to facilitate more complete combustion of coal.

It is an object of this invention to provide a chemical change agent to facilitate the complete combustion of coal, and It is another object of this invention to provide a synfuel additive which is environmentally acceptable and inexpensive, and These and other objects of this invention will become more apparent when reference is had to the accompanying specification

SUMMARY OF THE INVENTION

The present invention relates to an aqueous composition to be used as a synfuel additive for combustible materials, especially coal.

The product contemplated by this invention is a latex emulsion comprising a paraffin wax or wax, a polyvinyl alcohol and water. The percentage of each ingredient is as follows:

| | |
|---|---|
| Paraffin wax or wax | 22.5% |
| Polyvinyl alcohol | 3.5% |
| Water | 74.0% |

Other additives can be used to improve properties including varying percentages of polyvinyl acetate. A blend of 90% of the latex emulsion, specified above, with 10% polyvinyl acetate produced good burning results. Likewise, the latex emulsion by itself proved to be a satisfactory synfuel additive. The use of the polyvinyl alcohol, makes the emulsion.

The use of the polyvinyl agent produces a chemical change agent which turns the composition into a synfuel. The invention contemplates adding polyvinyl acetate to the composition to enhance it's combustibility. It is contemplated that 10% or more may be added to the composition. The range can be from 0 to 20%.

It is also contemplated to add a pigment composition to make the chemical change agent black so as to blend with the coal. The additive may interfere with the strength of the film.

The exact percentages of the ingredients apparently can vary as follows:

| | |
|---|---|
| Paraffin wax or other wax | 0% to 55% |
| Polyvinyl alcohol | 0% to 50% |

Further testing is required to determine if the polyvinyl alcohol will work by itself. The Paraffin wax will not qualify as a synthetic material unless it is a synthetic wax.

The combination of polyvinyl alcohol and wax is synthetic since the polyvinyl alcohol is synthetic and is required to emulsify the wax.

The best product will have a solids content of from 25% to 50% with a 2% to 10% of the solids coming from polyvinyl alcohol and the remainder coming from the wax. The polyvinyl acetate may be added as needed.

The action of the moisture barrier and vapor barrier aspects of the composition are thought to be important to the action of the synfuel.

DETAILED DESCRIPTION OF THE PREFERRED EMBODIMENT

The compositions of the invention generally comprise at least one hydrocarbon was dispersed in an aqueous emulsion, which can form a film on particles of coal. The emulsions used in the composition of the present invention are preferably made using polyvinyl alcohol as the emulsifying agent. Thus, in it broadest form, the present invention relates to an aqueous composition comprising a hydrocarbon wax, a polyvinyl alcohol emulsifying agent, and the balance of water.

The aqueous composition of the present invention is designed for use as a coating for application to materials when burned. The purpose of using the film of the present invention is aide the combustion of the material to which it is applied.

Typical materials to which the composition of the present invention may be applied include materials such as coal, both bituminous and sub bituminous as well as lignite, wood and rubber.

The aqueous film composition of the present invention may be applied to a number of different materials. Both whole coal as well as coal "tailings" or fines can be coated with the instant film to facilitate combustion of the resulting material as a synfuel.

Representative non-limiting examples of the hydrocarbon waxes of the present invention include paraffin wax, slack wax, microcrystalline wax, olefin waxes and other, conventional, know hydrocarbon waxes. More preferred hydrocarbon waxes are those made up of relatively high molecular weight components since such waxes tend to exhibit better film-forming properties.

The aqueous composition of the present invention comprises 5.0% to 45.0% by weight, based on the total weight of the composition, of the hydrocarbon wax. More preferably, the aqueous composition of the present invention comprises 10% to 35% by weight of the hydrocarbon wax and, as a preferred ratio, the aqueous coating composition of the invention comprises 15 to 25% by weight of the hydrocarbon wax. Naturally, the mixtures of one or more hydrocarbon waxes may also be employed in the aqueous composition.

In addition to water and the hydrocarbon wax, the aqueous coating composition of the present invention comprises an emulsifying agent such as that the aqueous composition forms an emulsion in water, which can be applied to a coal material. The emulsifying agents useful in the present invention are the polyvinyl alcohols. Any form of polyvinyl alcohol may be employed in the present invention irrespective of its degree of hydrolysis and/or degree of polymerization. However, the degree of polymerization and degree of hydrolysis of the polyvinyl alcohol may have an impact on the strength of the film, which is formed from the aqueous coating composition of the present invention. The specific polyvinyl alcohol which is selected to be used in the present invention will be that which demonstrates the best properties in terms of combustion.

The polyvinyl alcohol emulsifying agent is employed in an amount of 1.0% to 10.0% by weight, based on the total weight of the aqueous coating composition. More preferably, the polyvinyl emulsifier comprises 2 to 5% by weight of the composition Naturally, mixtures of two or more polyvinyl alcohols having differing degrees of hydrolysis and/or polymerization may be employed in the aqueous synfuel composition of the present invention.

The composition of the present invention may also optionally include up to 1.0% by weight of a biocide, based on the total weight of the composition. Such biocides are known in the art and include pesticides and other materials designed to prevent the growth of organisms in the aqueous coating composition during storage and use. The biocide will typically be employed in an amount sufficient to prevent the growth of living organisms in the aqueous coating composition during storage. Such amounts do not usually exceed 1.0% by weight and, more preferably, only up to 0.5% by weight of the biocide is employed. Most preferably, the biocide comprises up to 0.105 by weight of the aqueous synfuel composition.

In addition, the synfuel composition of the invention may optionally contain one or more filler materials. Any conventional filler material may be used for this purpose such as oxygen containing compounds like sugar, acedic acid and salts of acedic acid and other oxygen containing compounds may be added to improve combustion.

The synfuel composition of the invention may be made by mixing the ingredients using a conventional mixing apparatus. If a prolonged storage period is anticipated, it is preferred to run the composition through a homogenizer before putting it in a storage container. The composition is storage stable for prolonged periods of six months or more. The addition of a biocide prevents the growth of undesirable organisms.

The synfuels composition of the present invention can be applied in any conventional manner. For example, the composition my be applied using spray guns immersion, etc.

The instant invention also meets all the Federal Air Quality Regulations in 40 C. F. R. This is very significant since conventional, commercially available synfuels, do not, in a lot of cases, meet the Federal Standards, as they contain hazardous components and/or volatile organic compounds.

Hence, the instant invention is environmentally friendly. The addition of polyvinyl acetate to the basic composition enhances it burning ability when used with coal.

In addition to being non-toxic and containing no volatile organic compounds, the present invention does leave any residue necessitating clean up after combustion. In fact, it facilitates a more complete combustion of the coal and hardly leaves any residue.

Figure 1:
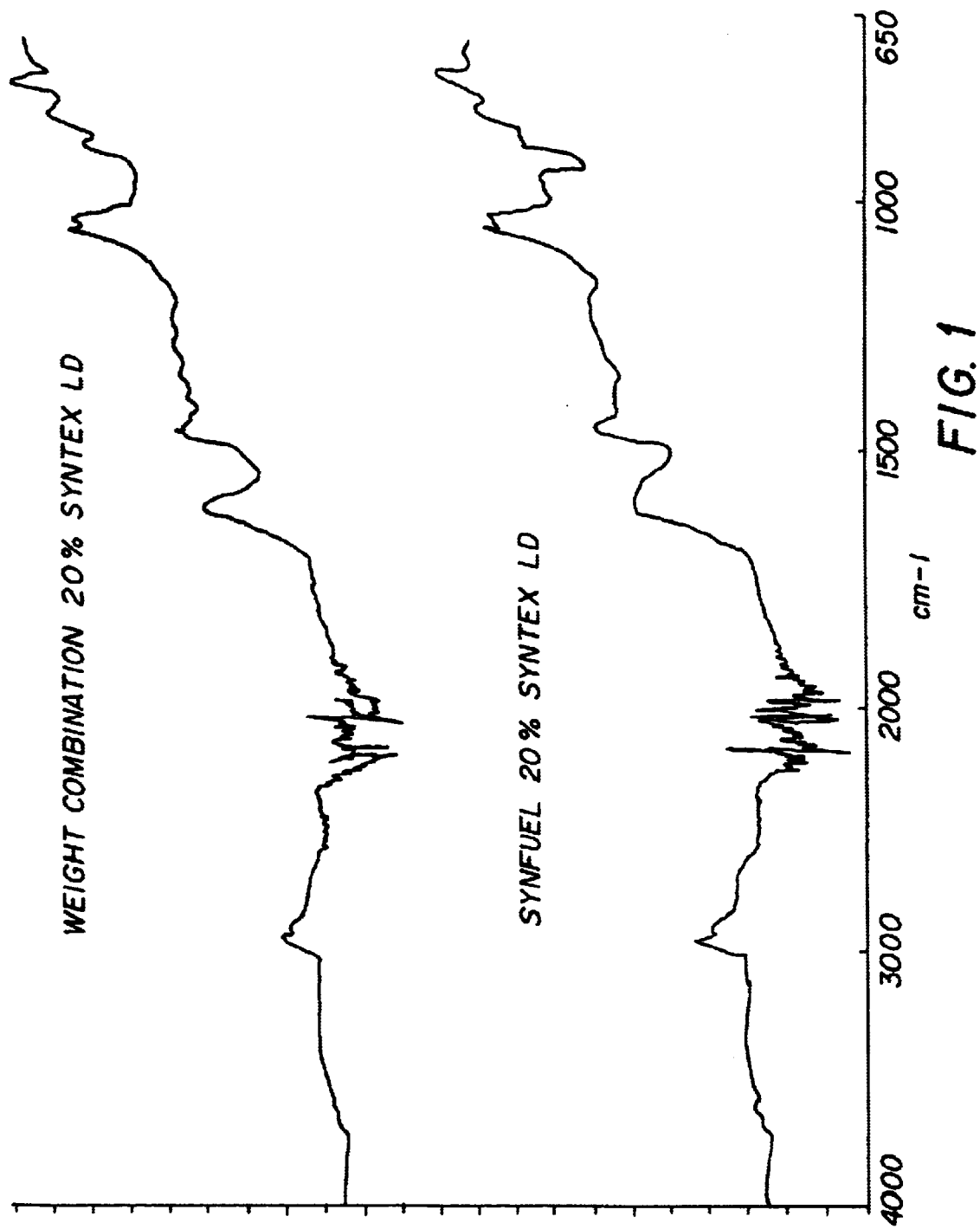
FIG. 1 is a graph of the chemical changes in weight combination contrasted with the synfuel 0.20% Syntex LD.

Tests on the New Synfuel Additive Known as Syntex with High Volume Coal Fines

Basically the new substance which forms the core of this invention converts raw coal fines into a synthetic fuel product. The substance, classified as a chemical change agent, contains functional groups, which are chemically active, and combine with coal to bring about a compositional change. The object of the tests was to determine whether or not the chemical change agent provided would bring about sufficient chemical reactions when combined with the feedstock coal fines to produce a synthetic fuel product.

Raw coal fines are combined with the chemical change agent. The two substances were then mixed to insure maximum contact to allow a chemical reaction to occur. The mixture was then compressed to form the synthetic fuel product. These distinctive conditions were simulated during the test to effectively recreate those found within a synthetic fuel plant.

The chemical combinations of the mixture can produce a synthetic fuel source with a decidedly different chemical composition than that of a physical mixture of the coal and agent The industry standard is a minimum of 15% chemical change.

The two mixture ingredients were separately analyzed as was the mixture product using Fourier Transform Infrared spectroscopy in order to confirm or disprove an actual chemical change within the synthetic fuel product.

Fourier Transform Infrared spectroscopy allows one to observe the chemical structures of materials. In this case, the analysis was used to search for a difference in spectra among the samples tested. Differences in the spectra of the material indicates a chemical change among the materials. These spectral changes can range from differences in intensity at equivalent frequencies to different peak structures at equivalent frequencies.

The analysis spectra displayed an obvious and measurable chemical change between the synthetic fuel product and the raw coal fines. These measurable spectra differences indicate that the synthetic fuel is a product of intricate chemical changes and not just a physical combination of coal and the chemical change agent.

Two chemical change agents were used in the test. The first was Syntex-LD and the second was Syntex-MD The raw coal sample was meticulously mixed and riffed to garner a smaller sample for analysis. The raw coal was reduced in particle size using a mortar and pestle through a sixty mesh screen. The grinding process was performed at a minimal pace and care was taken to clean all instruments in order to avoid a cross-contamination of samples. The same process was used on the synthetic fuel mixture.

During the test, the raw coal, chemical change agent and synthetic fuel spectra were obtained with a Perkin Elmer Spectrum One FTIR spectrometer. Thirty-two scans of each sample comprised an average to obtain final spectra listed below.

Fourier Transform Infrared Spectroscopy is useful for determining chemical bonds within substances. Alterations in the spectra of raw coal and the synthetic fuel indicate a change in the chemical bonds at these wavelengths. Thus, a greater or lesser number of certain bonds at a wavelength will lead to a change in the spectra involved The bonds most often seen pertaining to raw coal and the synthetic fuel product are:

1. Carbon-carbon bonds. Basic organic molecules are constructed of carbon-carbon bonds. These bonds may be either aromatic or aliphatic. Aromatic carbon atoms are joined in a ring structure and involve double bonds among the carbon bonds. The infrared area of interest for these bonds is around 1500–1650 wave numbers. It should be noted that most of the bond stretching occurs in the range of 1600–1650 wave numbers. Any change in intensity of two spectra or peak structure in this area would indicate a definite chemical difference between two substances. Thus, if the synthetic fuel product displays a greater or lesser intensity in this range than the raw coal a chemical change has occurred. Peak structure differences in this range would indicate a chemical change.

2. Carbon-Oxygen bonds. These adsorb infrared light from 1050–1250 wave numbers. The actual range of adsorption will vary depending upon whether or not it is attached to an aliphatic or aromatic carbon base. Any change in intensity of two spectra or peak spectra in this area would Indicate a chemical difference between two substances.

3. Carbon-Hydrogen bonds. These bonds are prominent in aliphatic carbon structures with peak adsorption of infrared light at around 1360 and 1430–1470 wave numbers. In aromatic carbons the carbon-hydrogen bonds adsorb infrared light from about 650–925 wave numbers.

Fourier Transform Infrared Spectroscopy Results

Figure 2:
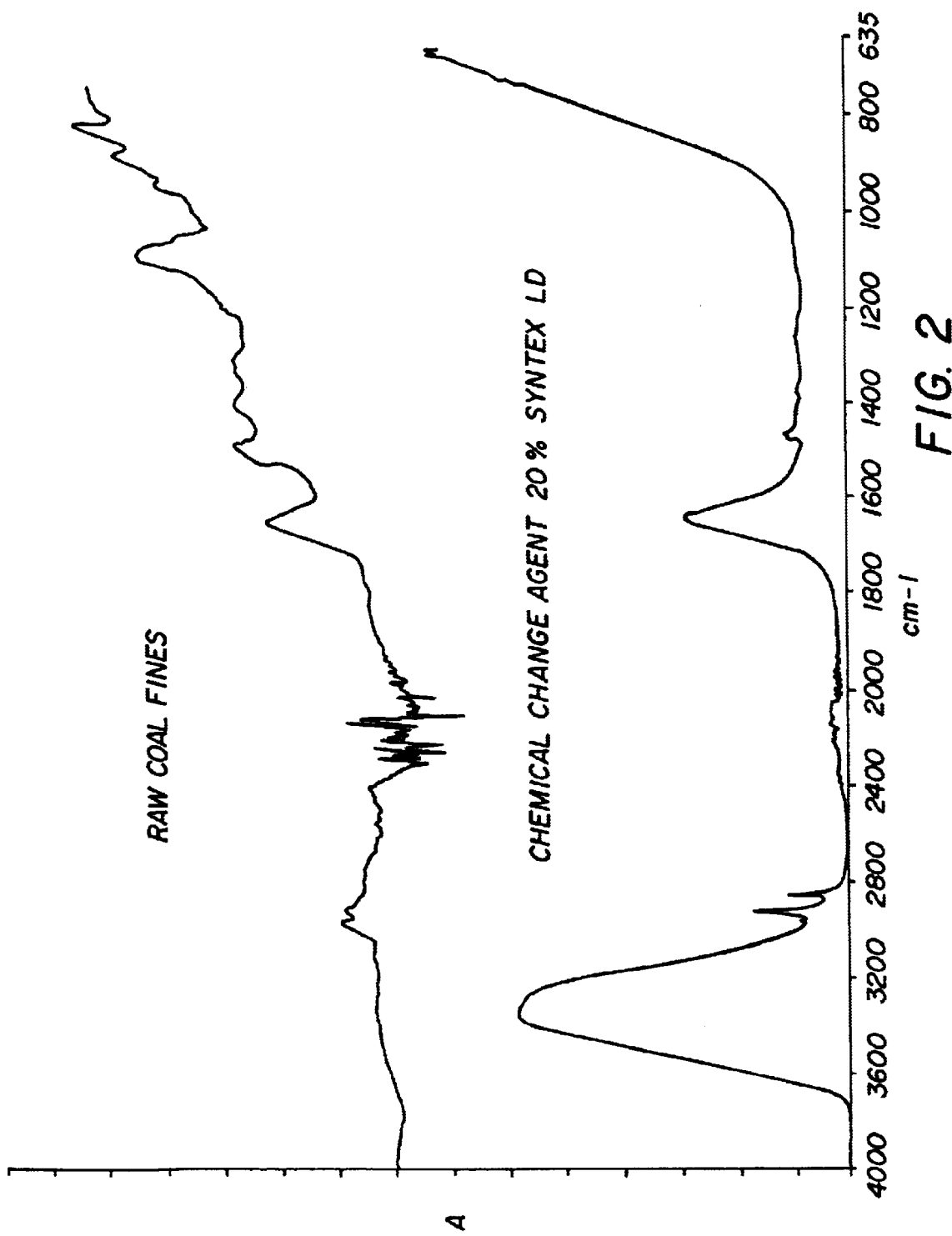
FIG. 2 is a graph of the chemical changes in weight of the raw coal fines and the chemical change agent 0.20% Syntex LD.

There are comparisons of raw coal fines, synthetic fuel product and the chemical change agent on the graphs shown as FIGS. 1 and 2. The synthetic fuel contained 0.20% wt. of the agent and 99.80% of raw coal. In order to construct a weight combination spectra the agent spectra was multiplied by 0.0020 and the raw coal spectra was multiplied by 0.9980. These two spectra were then added together to form the Weight Combination spectra. This addition accounts for the percentage of agent and raw coal within the sample itself.

Thus, a difference in the weight combination spectra and the spectra of the synthetic fuel product would indicate a difference in chemical bonds associated with each spectra. Therefore, a change in the weight combination spectra as compared to the synthetic fuel spectra would serve as evidence that an actual chemical change has occurred in the formation of the synthetic fuel.

In this particular analyzation, the synthetic fuel spectra is significantly and measurable different from the spectra of the weight combination spectra using the prescribed agent. The calculated mathematical difference between the weight combination spectra and that of the synfuel spectra totaled a net 23% change. This difference confirms the claim the the synthetic fuel product is the production of chemical changes and not merely a physical mixture.

FIGS. 1 and 2 show the differences between the raw coal, the agent and the two mixtures, Syntex-LD and Syntex-MD. The LD and MD stand for low density and medium density, terms used to describe coal.

The results showed spectral changes and include:

1. An increase in absorbance of the doublet peak at around 1050 wave numbers. This area is associated with carbon-oxygen bonds. The increase of the synthetic fuel's absorbance in this area indicates a differing type of bonding than that of a physical mixture.

2. An increase in absorbance at 1600 wave numbers which is associated with aromatic carbon-carbon bonds. This indicates that the synthetic product has more aromatic carbon-carbon bonds than a physical mixture would have.

3. An increase in absorbance at 2900 wave numbers. This is an area of absorbance associated with carbon-hydrogen bonds. The synthetic fuel product displays a larger number of these bonds than those that would be found in a physical mixture.

4. An increase in absorbance at 1440 wave numbers. This is an area of absorbance associated with carbon-hydrogen bonds as well. The synthetic fuel product displays a larger number of these bonds than those that would be found in a physical mixture.

Figure 3:
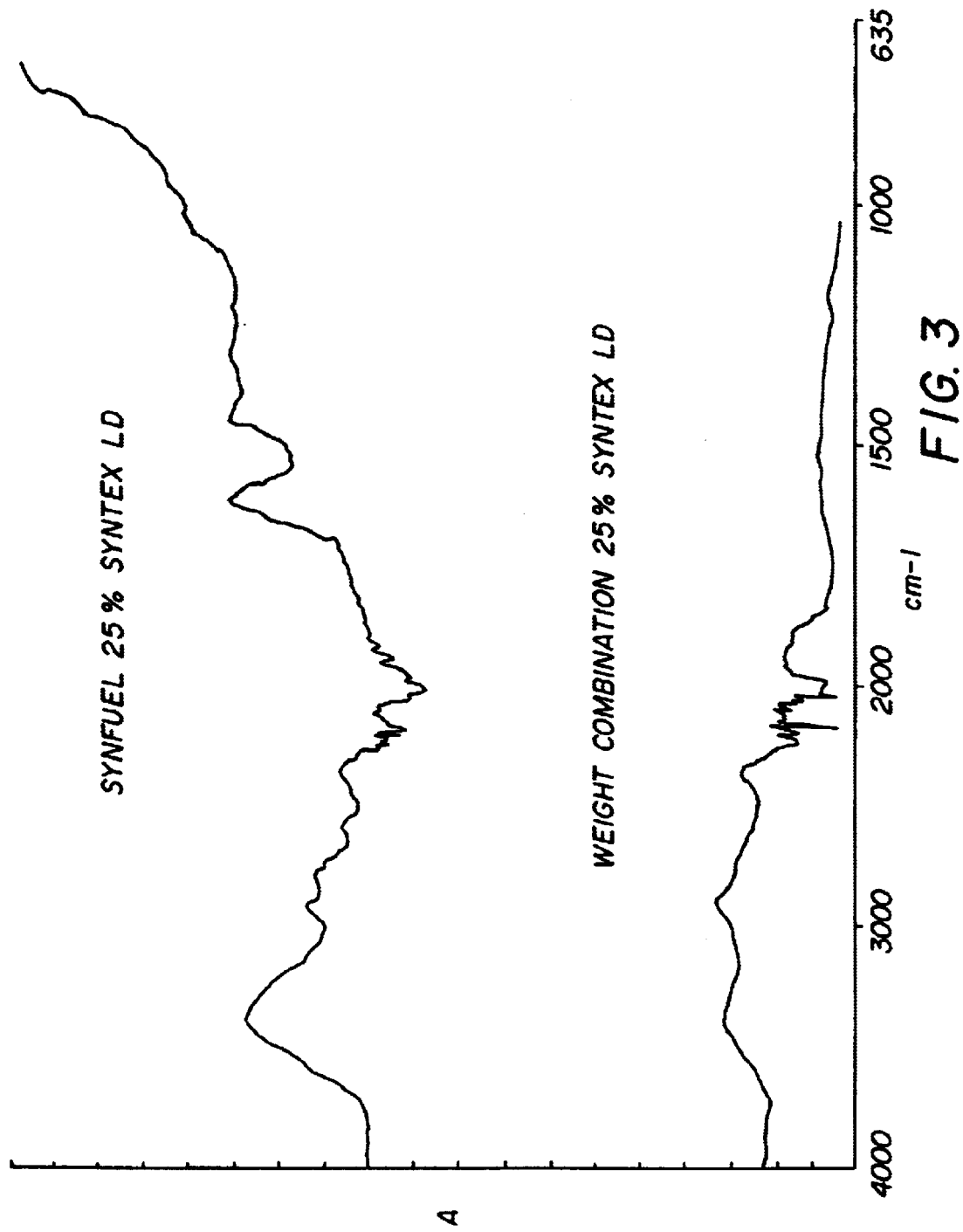
FIG. 3 is a graph of the chemical change in weight of the feedstock coal fines and the chemical change agent 0.20% Syntex LD.
Figure 4:
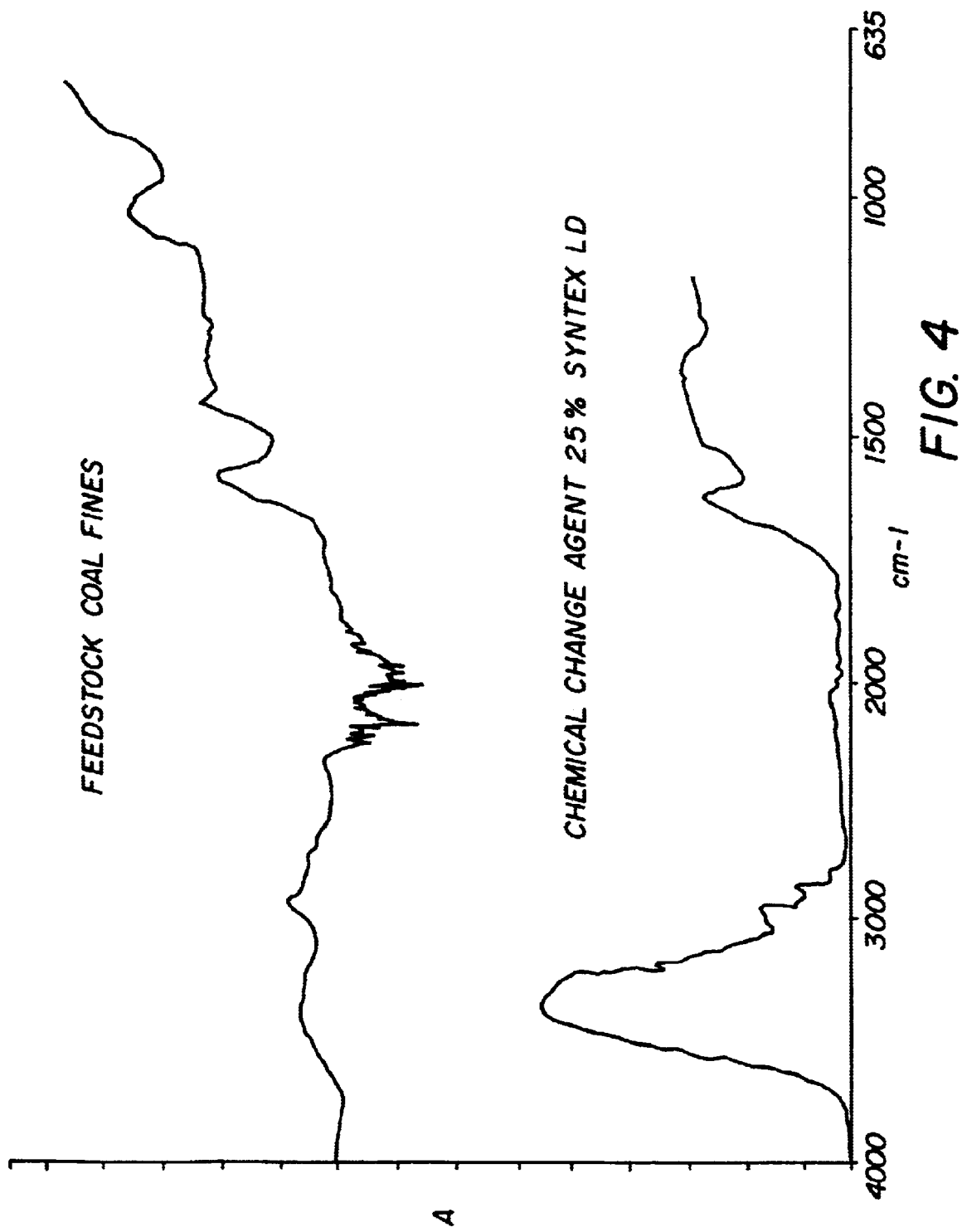
FIG. 4 is a graph of the chemical change in weight of the synfuel 0.25% Syntex LD and the weight combination 0.25% Syntex LD.

In conclusion the analysis proved the chemical changes occur when the chemical change agent of this invention, either Syntex-LD or Syntex-MD is combined with raw coal fines to create a synthetic fuel product Tests on the Chemical Change Agent Know as Syntex with Low Volume Coal Fines The same tests were run and the results of the Fourier Transform Infrared Spectroscopy are as follows:

There are comparisons of the raw coal fines, synthetic fuel product and the agent on the graphs shown as FIGS. 3 and 4. The synthetic fuel contained a 0.25% wt of agent and 99.75% wt of raw coal. In order to contstruct a weight combination spectra the agent spectra was multiplied by 0.0025 and the raw coal spectra was multiplied by 0.9975. These two spectra were then added together to form the Weight Combination spectra. This addition accounts for the percentage of agent and raw coal within the sample itself.

Thus, a difference in the weight combination spectra and spectra associated with the synthetic fuel product would indicate a difference in chemical bonds associated with each spectra. In this analyzation, the synthetic fuel spectra is significantly and measurable different from the spectra of the weight combination spectra using the prescribed agent. The calculated mathematical difference between the weight combination spectra and that of the synfuel spectra total a net 19% change. This difference confirms the claim that the synthetic fuel product is the production of chemical changes and not a mere physical mixture.

The spectral changes that point to the chemical reactions and change include:

1. An increase in absorbance of the doublet peak at around 1050 wave numbers. This area is associated with carbon-oxygen bonds.

2. An increase in absorbance at 1600 wave numbers. This area is associated with aromatic carbon-carbon bonds.

3. An increase in absorbance at 2900 wave numbers which is associated with carbon-hydrogen bonds. The number of bonds is larger than in a mere mixture.

4. An increase in absorbance at 1440 wave numbers which is associated with carbon-hydrogen bonds as well.

The conclusion is that again with low density coal, several chemical changes occurred when the agent was combined with the coal. The mixture is another entity entirely when compared with the raw coal and agent in physical combination.

The samples are as follows:

| | | |
|---|---|---|
| Syntex LD | 0.20% | 21% |
| Syntex LD | 0.20% | 27% |
| Syntex LD | 0.20% | 15% |
| Syntex LD | 0.20% | 13% |

Having described the preferred embodiments of the invention it will be obvious to those of ordinary skill in the art that many changes and modifications can be made to the invention without departing from the scope of the appended claims.

What is claimed is:

1. A chemical change reagent for use as an additive for coal to facilitate chemical bonding therewith and to facilitate complete combustion thereof, said chemical change reagent consisting essentially of at least 1.0% by weight of polyvinyl alcohol, 10% to 35% by weight of a hydrocarbon wax from the group consisting of paraffin wax, slack wax, microcrystalline wax, olefinic wax and mixtures thereof, and the balance of water, all being referred to as the ingredients, wherein all weight percentages are based on the total weight of the reagent which combines with said ingredients to provide for improved combustion of said coal.

2. A reagent as claimed in claim 1 in which the percentage by weight of the ingredients consists essentially of polyvinyl alcohol 2 to 5%, 15 to 30% weight of the hydrocarbon wax, 0 to 0.5% of a biocide and the balance of water.

3. A reagent as claimed in claim 2 in which the percentage by weight of the materials consists essentially of 2 to 4.5% by weight of polyvinyl alcohol, 15 to 25% by weight of the hydrocarbon wax, 0 to 0.10% by weight of a biocide and the of water.

4. A reagent as claimed in claim 2 which further consists essentially of 1.0% to 10.0% by weight of one or more filler materials, based on the total weight of the reagent.

5. The reagent as in claim 1 and further consisting essentially of a percentage of polyvinyl acetate in said composition.

6. The reagent of claim 5 wherein said percentage of polyvinyl acetate is 10% or less.

7. The reagent of claim 1 and further consisting essentially of raw coal added to said reagent.

8. The reagent of claim 7 and further comprising polyvinyl acetate.

9. The reagent of claim 6 wherein the percentage of polyvinylacetate is 10%.

10. The reagent of claim 5 wherein the rang of polyvinyl acetate is 20% or less.

11. A method of assisting complete combustion of coal, said method comprising the step of applying to the coal, a chemical change reagent in which the percentages by weight of the materials consists essentially of 1.0 to 10.0% by weight of polyvinyl alcohol, 10.0 to 35.0% by weight of a hydrocarbon wax selected from the group consisting of paraffin wax, slack wax, microcrystalline wax, olefinic wax and mixtures thereof, and the balance of water, wherein all weight percentages are based on the total weight of the composition, and allowing a chemical change to occur.

12. A method as claimed in claim 11 wherein said reagent is in the form of an emulsion.

13. A method as claimed in claim 11 wherein said reagent also further consists essentially of 1.0 to 10.0% by weight of a filler material, based on the total weight of the reagent.

14. A method as claimed in claim 11 wherein said reagent consists essentially of 2 to 4.5% by weight of polyvinyl alcohol, 15 to 25% by weight of said hydrocarbon wax, 0 to 0.505 percentage by weight of a biocide, and the balance of water.

15. A method as claimed in claim 11 wherein the composition is applied to the coal by spraying.

16. A chemical change reagent which reacts with coal to chemically change the functional group bonding found therein, said reagent consisting essentially of:

An amount from 1 to 10% of polyvinyl alcohol,

An amount from 5 to 55% of wax hydrocarbon

An amount from 0 to 20% of polyvinyl acetate

An amount of from 1 to 10% of filler material

And the balance is of water.

17. A reagent as in claim 16 and further consisting essentially of a biocide.

* * * * *